United States Patent [19]
Lang et al.

[11] 3,864,262
[45] Feb. 4, 1975

[54] POOL FILTER SYSTEM

[75] Inventors: Robert S. Lang; Robert L. Carnot, both of Tampa, Fla.

[73] Assignee: L. F. Lang & Son Pools, Inc., Tampa, Fla.

[22] Filed: Mar. 14, 1973

[21] Appl. No.: 341,108

[52] U.S. Cl. .............................................. 210/169
[51] Int. Cl. .............................................. E04h 3/20
[58] Field of Search ...................................... 210/169

[56] References Cited
UNITED STATES PATENTS

| | | | |
|---|---|---|---|
| 2,980,256 | 4/1961 | Nash | 210/169 |
| 3,036,712 | 5/1962 | Barbara | 210/169 |
| 3,616,918 | 11/1971 | Diemond et al. | 210/169 |
| 3,749,244 | 7/1973 | Jannuzzi, Jr. | 210/169 |
| 3,759,389 | 9/1973 | Valois et al. | 210/169 |
| 3,765,534 | 10/1973 | West et al. | 210/169 |

*Primary Examiner*—Frank A. Spear, Jr.
*Attorney, Agent, or Firm*—Oltman and Flynn

[57] ABSTRACT

A self-contained filter system for attachment directly to a wall of a swimming pool at a single opening in the pool wall. The filter system may be used for water filtration, skimming, recirculation and pool vacuuming, operating under partial vacuum at low water velocity in all modes.

5 Claims, 1 Drawing Figure

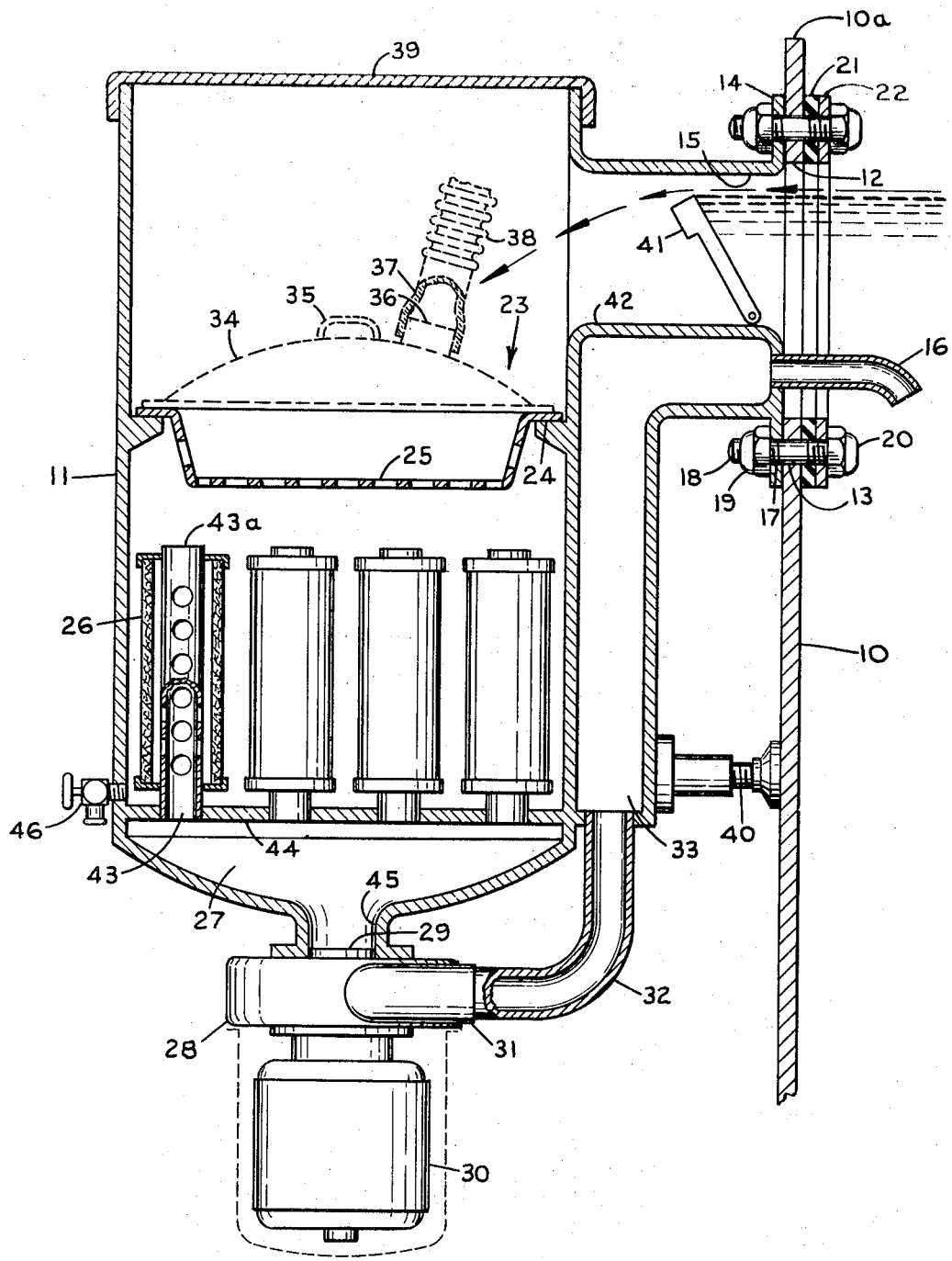

POOL FILTER SYSTEM

BACKGROUND OF THE INVENTION

This invention relates to a filter system for use with a pool, particularly in above-ground pool.

Conventional filter installations for above-ground swimming pools usually are cumbersome and difficult to install, with the pump, filter, surface skimmer and return water inlet for water recirculation being separate from the pump, filter and return water inlet for pool vacuuming. Such arrangements require exposed hoses and/or pipes outside the pool for conducting the water back and forth between the pool and the different pumps, filters, etc. When any exposed hose or hose clamp fails, pool water floods the immediate area. In addition, such installations require penetration of the above-ground pool wall at more than one location to make the necessary hydraulic connections. These and other factors contribute to the labor and aggravation involved with such installations.

BRIEF DESCRIPTION OF THE INVENTION

The present invention is directed to a novel and improved filter system for use with above-ground pools which avoids these difficulties and disadvantages. The present filter system has all the necessary components housed in a single unitary assembly that may be readily attached to an above-ground wall of the pool with a minimum of effort and expense. It is free of external hoses and the like, and in the preferred embodiment it requires penetration of the pool wall at one location only, where it is attached hydraulically and structurally. Also, in the preferred embodiment, in common with the disclosure in the co-pending U.S. Pat. application Ser. No. 340,671, filed Mar. 13, 1973, and assigned to the same assignee as the present invention, and Disclosure Document No. 007,559 by Robert S. Lang and Robert L. Carnot filed Nov. 3, 1971, only one pump and filter assembly is needed to provide both water recirculating and pool vacuuming operations, and in both modes of operation the filtering is done under partial vacuum, instead of high pressure. This is advantageous because of the lower water velocity and turbulence involved, enabling the use of lighter, less bulky and less expensive equipment for satisfactory results with a given sized pool. Also, the vacuum operation of the filter cartridges gives them a longer filter cycle between successive cleanings and a longer useful life before replacement becomes necessary.

Accordingly, it is a principal object of this invention to provide a novel and improved self-contained filter system for an above-ground pool.

Another object of this invention is to provide such a filter system which may be readily attached directly to a wall of the pool in a novel and advantageous manner.

Another object of this invention is to provide such a filter system which requires penetration of the pool wall at only one location to make the necessary structural and hydraulic connections of the complete filter system to the pool.

Another object of this invention is to provide a novel and improved self-contained filter system for an above-ground pool in which only a single pump and a single set of filter elements acomplish filtration in all modes of operation.

Another object of this invention is to provide a filter system as just mentioned in which the pump draws water through the filter elements under partial vacuum.

Another object of this invention is to provide a novel and improved filter system for attachment to an above-ground wall of the pool in which the filter elements may be cleaned in place, without being removed from the system.

Further objects and advantages of this invention will be apparent from the following detailed description of a presently-preferred embodiment thereof, which is shown in vertical section in the single FIGURE of the accompanying drawing.

Referring to the drawing, an above-ground, vertical wall of a swimming pool is designated by the reference numeral 10. The filter system of the present invention has a rigid housing structure 11 that is attached to this wall of the pool close to its top edge 10a. When installing this filter, the pool wall 10 is cut open to provide a relatively large opening 12 and a series of small bolt holes 13 closely spaced around this opening.

At one side near its upper end the filter housing 11 presents a transverse, vertical, annular flange 14 for abutting engagement with the outside of the pool wall 10 around the latter's opening 12. This flange extends around a large inlet opening 15 in the filter housing which registers with the opening 12 in the pool wall. The flange 14 also carries one or more small diameter, jet-forming tubes 16 closely spaced below the inlet opening 15 and projecting through the pool wall opening 12 into the interior of the pool when the filter housing is attached to the pool wall.

If two of the return jet tubes 16 are provided, they may be inclined at opposite acute angles laterally of the pool, so that one tends to circulate the water clockwise at one side of the pool and the other tends to circulate the water counterclockwise at the opposite side of the pool, with the returns of both the clockwise and counterclockwise currents in the pool converging at the filter inlet 15 for more effective skimming of debris floating on the surface of the pool.

The flange 14 on the filter housing also has a series of bolt holes 17 which register individually with the bolt holes 13 in the pool wall. A bolt 18 extends through each aligned pair of these bolt holes, and nuts 19 and 20 are threaded onto the opposite ends of each bolt. An annular gasket 21 of rubberlike material and an annular thrust plate 22 are engaged by nuts 20 inside of the pool wall 10. When the nuts are tightened, the flange 14 on the filter housing is clamped in water-tight fashion against the outside of the pool wall to provide both a structural attachment and hydraulic connections of the filter to the pool.

Toward the lower end of the filter housing one or more adjustable stand-off screws 40 are engaged between the outside of the pool wall 10 and the inner side of the filter housing 11 to position the major axis of the filter housing substantially vertically.

A self-adjusting weir 41 is pivotally mounted in the filter housing at the inlet opening 15, at the front end of a horizontal inlet passage. The weir is buoyant and adjusts to different water levels. Weirs of this type are disclosed for example in U.S. Pat. Nos. 2,701,235; 2,809,752; 2,844,255 and 3,316,934. At the opposite end of this inlet passage a vetical chamber 23 in the filter housing extends downward. An annular, internal, upwardly-facing shoulder 24 on the filter housing at this chamber supports a perforated, dished tray 25 for catching leaves and the like. Water spills over weir 41 into the tray 25. Preferably, each of these filter cartridges is of specially treated paper or spun fiberglass and is constructed to prevent dirt penetration too deeply into the cartridge. These cartridges are disposed vertically within the chamber 23, and they have central discharge passages which communicate through apertured pipes 43a with corresponding openings 43 in a horizontal support plate 44 extending across the lower end of chamber 23. Below this support plate and at the extreme lower end of the filter housing 11 is located a vacuum plenum 27 having a central outlet 45 at the bottom.

A pump 28 is rigidly attached directly to the bottom of the filter housing 11, with the centrally-positioned pump inlet 29 registering with the vacuum plenum outlet 45. Preferably, this pump is a centrifugal pump of known design. The pump rotor is driven directly by an electric motor 30 suspended from the pump housing.

The vacuum operation of the filter cartridges, with direct coupling of the pump inlet 29 to the vacuum plenum 27, eliminates the need for the usual hair and lint strainer just ahead of the pump to prevent fouling of the pump impeller. Such a strainer is troublesome in that it requires periodic inspection and cleaning, and it is another source of leakage.

The pump outlet 31 is connected through an upwardly bent, metal or plastic tube 32 to the lower end of a pressure chamber 33 in the filter housing at the inner side of the latter (toward the pool wall 10). This pressure chamber extends upward substantially coextensive vertically with the filter chamber 23 in housing 11, and its upper end extends horizontally toward the flange 14 on this housing and directly below the inlet passage 42. The inlet ends of the return jet tube or tubes 16 communicate with the upper end of the pressure chamber 33 at the inner side of the housing 11.

The present filter system also has a removable shut-off lid 34 provided with a handle 35. This lid may be placed over the perforated tray 25 to seal off the chamber 23 below when it is desired to vacuum clean the pool. The lid has an upstanding collar 36 for receiving the usual rubber cuff 37 on the end of a vacuum hose 38 connected to a conventional pool vacuum cleaner (not shown).

A close-fitting cover 39 is provided on the top of the filter housing 11. However, it is to be understood that this cover need not be bolted on, as is commonly the case with the covers for pool filter systems which operate under substantial positive water pressure.

In the operation of this filter system, the self-adjusting weir 41 at the inlet opening 15 permits water to flow from the pool down into the filter chamber 23, and it performs a skimming function. The static water level in the filter housing 11 is substantially the same as the water level in the pool.

When the filter system is operated in the water-circulating mode, the lid 34 preferably is removed to permit free circulation of water from the pool down into the filter chamber 23. (However, if desired, the lid 34 may be left in place and the flow of water down into the filter chamber 23 will take place through the opening defined by the collar 36.)

The pump 28 creates a partial vacuum in the vacuum plenum 27 and causes water to be drawn from the pool through the opening 12 in the pool wall 10 and the inlet opening 15 in the filter housing, past the weir 41 and along the inlet passage 42 and down into the chamber 23. The water is drawn through the filter cartridges 26 under partial vacuum and down through the support plate opening 43 into the vacuum plenum 27 and from there into the pump inlet 29.

At the pump outlet 31, the water is discharged under appreciable pressure up through the pipe 32 and pressure chamber 33 to the return discharge jet tubes 16, which deliver it under pressure back into the pool.

When the filter system is operated in the vacuum-cleaning mode, the top cover 39 is removed and the lid 34 is placed over the perforated tray 25. The end of the vacuum hose 38 is attached to the collar 36 on the lid, and the partial vacuum created by the pump draws water through the vacuum cleaner (not shown) and through hose 38 down into the filter chamber 23, after which the flow path is the same as just described in detail for the water-recirculating mode.

The filter cartridges 26 may be cleaned in place inside the housing structure 11. When such cleaning is to be done, the pump 28 is shut off, the top cover 39, lid 34 and leaf tray 25 are removed, and the weir 41 is raised to a vertical position in which it completely blocks the inlet opening 15. Any suitable catch (not shown) may be provided for holding the weir in this closed position. A normally closed drain clock 46, which communicates with the filter chamber just above the support plate 44, is opened.

The in-place cartridges 26 may be cleaned by a garden hose, and the dirty water washed off the cartridges flows out of the filter chamber through the drain cock 46.

In the just-described, presently-preferred embodiment of this invention, the requirement for only a single pump and set of filter elements, used in all modes of operation of the system, minimizes the size and weight of the filter system and makes possible the simplicity of its connection, both hydraulically and structurally, to the pool. The operation of the filter under partial vacuum, instead of under appreciable water pressure, eliminates the need for a heavily constructed filter housing with a bolted-on cover. In addition, the vacuum operation of the filter, with low water velocity and turbulence, greatly increases the useful life of the filter cartridges before either cleaning or replacement becomes necessary. Consequently, a substantial reduction in the cost of pool maintenance may be realized, both in labor and in the cost of the filter cartridges themselves. In the preferred embodiment, with the inlet opening 15 and the return jet tubes 16 positioned close enough to each other that both register with a single opening 12 in the pool wall, penetration of the pool wall is required at only this one location. However, there may be situations in which it will be preferred that the inlet opening 15 and the return jet tubes 16 register with separate openings in the pool wall, but it will be apparent that such an arrangement would involve added expense due to the additional sealed connection that must be made.

Also, it is to be understood that the present filter system may be used for in-ground pools, if desired, simply by providing a fitting on the housing structure 11 just below the lid 34 for connection to a line going to a drain at the bottom of the pool.

Having thus described our invention, we claim:

1. A pool filter system for attachment at a single water level opening in an above-ground pool wall comprising:

a unitary housing having a vertical chamber therein and a horizontal support plate extending across said chamber near its lower end;

a pump suspended from the lower end of said housing and having its inlet communicating with said chamber below said support plate;

said support plate having a plurality of vertical openings therein, a plurality of apertured pipes mounted in said openings in the support plate and extending upward therefrom inside said chamber, a plurality of generally cylindrical filter cartridges mounted on said pipes above said plate to filter the water passing down through said chamber and through said cartridges and pipes and said openings in the support plate into the pump inlet;

said housing at one side thereof near its upper end having a laterally outwardly offset portion integral therewith which presents a horizontal inlet passage leading into said chamber near the latter's upper end and a horizontal discharge passage immediately below said inlet passage, each of said passages being open at the outer end thereof away from said chamber in the housing for registration with said opening in the pool wall;

said housing at said one side thereof having an outer portion thereof which is offset laterally inward from the outer ends of said inlet and discharge passages and defines a vertical pressure chamber located outside said firstmentioned chamber in the housing, said pressure chamber having its lower end connected to the outlet of said pump and having its upper end opening into said discharge passage;

means for sealingly attaching the outer end of said offset portion of the housing to the outside of the pool wall around the single opening therein with the outer ends of said inlet and discharge pasages both registering directly with said opening in the pool wall;

and rigid stand-off means extending laterally outward from said outer portion of the housing at a location thereon substantially below said offset portion of the housing for engagement with said pool wall to space the lower end of the housing rigidly from the pool wall.

2. A pool filter system according to claim 1, and further comprising means providing two discharge openings at the outer end of said discharge passage which are inclined at opposite acute angles laterally apart for respectively discharging clockwise and counterclockwise streams of water back into the pool.

3. A pool filter system according to the claim 1, and further comprising:

a removable lid covering the top of said housing at the upper end of said first-mentioned chamber therein;

and a strainer removably mounted in said first-mentioned chamber above said filter cartridges to provide access to the filter cartridges from the top of said housing when said lid and said strainer are removed.

4. A pool filter system according to claim 3, and further comprising a drain valve on said housing immediately above said support plate for draining said first-mentioned chamber above the support plate.

5. A filter system according to claim 1 wherein said discharge opening is directly below said inlet opening.

* * * * *